(12) United States Patent
Das et al.

(10) Patent No.: US 12,306,308 B2
(45) Date of Patent: May 20, 2025

(54) STRUCTURED LIGHT NAVIGATION AID

(71) Applicant: Honeywell International Inc., Charlotte, NC (US)

(72) Inventors: Shouvik Das, Bangalore (IN); Deena Dayalan Kothandaraman, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 1007 days.

(21) Appl. No.: 17/220,344

(22) Filed: Apr. 1, 2021

(65) Prior Publication Data

US 2022/0260721 A1 Aug. 18, 2022

(30) Foreign Application Priority Data

Feb. 17, 2021 (IN) .............................. 202111006634

(51) Int. Cl.
*G01S 17/00* (2020.01)
*G01S 7/484* (2006.01)
*G01S 7/486* (2020.01)
*G01S 7/4911* (2020.01)
*G01S 7/4912* (2020.01)
(Continued)

(52) U.S. Cl.
CPC ............ *G01S 17/931* (2020.01); *G01S 7/484* (2013.01); *G01S 7/486* (2013.01); *G01S 7/4911* (2013.01); *G01S 7/4912* (2013.01); *G01S 17/933* (2013.01)

(58) Field of Classification Search
USPC ........................................................ 356/4.01
See application file for complete search history.

(56) References Cited

U.S. PATENT DOCUMENTS

| 4,954,962 A | 9/1990 | Evans, Jr. et al. |
| 8,019,490 B2 | 9/2011 | Ferren et al. |
| | (Continued) | |

FOREIGN PATENT DOCUMENTS

| CN | 211554750 U | 9/2020 |
| KR | 20180098055 A | 9/2018 |
| | (Continued) | |

OTHER PUBLICATIONS

Mittal et al. "Vision-Based Autonomous UAV Navigation and Landing for Urban Search and Rescue", at least as early as Jun. 4, 2019, pp. 1 through 16.

(Continued)

*Primary Examiner* — James R Hulka
(74) *Attorney, Agent, or Firm* — Fogg & Powers LLC

(57) ABSTRACT

Systems and Embodiments for a structured light navigation aid are provided. In certain embodiments, a system includes a structured light emitter that emits structured light towards a surface, wherein the structured light emitter can movably change a direction of emitted structured light. Additionally, the system includes a structured light receiver that receives light from an environment, wherein the structured light receiver identifies reflected structured light from the surface in the received light and calculates navigation information from the reflected structured light. Further, the system includes one or more processors that control the structured light as one of a pre-programmed pattern or a pattern determined during operation of the structured light emitter.

20 Claims, 9 Drawing Sheets

(51) Int. Cl.
 *G01S 17/931* (2020.01)
 *G01S 17/933* (2020.01)

(56) References Cited

U.S. PATENT DOCUMENTS

| | | | |
|---|---|---|---|
| 8,244,403 B2 | 8/2012 | Lin et al. | |
| 8,554,395 B2 | 10/2013 | Andersson | |
| 11,049,406 B2* | 6/2021 | Gandiga | G08G 5/0021 |
| 11,064,184 B2* | 7/2021 | Choi | G01B 11/2545 |
| 11,194,344 B2* | 12/2021 | Li | B64C 39/024 |
| 11,353,588 B2* | 6/2022 | Onal | G01S 17/931 |
| 11,922,819 B2* | 3/2024 | Demri | G05D 1/0676 |
| 2005/0090907 A1* | 4/2005 | Hudson | G05B 19/0421 700/1 |
| 2009/0118890 A1 | 5/2009 | Lin et al. | |
| 2009/0138138 A1* | 5/2009 | Ferren | G05D 1/0676 359/333 |
| 2011/0285981 A1 | 11/2011 | Justice et al. | |
| 2012/0130566 A1* | 5/2012 | Anderson | G05D 1/0858 701/16 |
| 2016/0349746 A1 | 12/2016 | Grau | |
| 2019/0068953 A1 | 2/2019 | Choi et al. | |
| 2019/0086550 A1* | 3/2019 | Dussan | G02B 26/108 |
| 2019/0187724 A1 | 6/2019 | Li et al. | |
| 2020/0067278 A1 | 2/2020 | Han et al. | |
| 2020/0142069 A1 | 5/2020 | Onal et al. | |
| 2020/0202727 A1 | 6/2020 | Gandiga | |
| 2020/0249357 A1 | 8/2020 | Becker et al. | |
| 2020/0334993 A1 | 10/2020 | Demri et al. | |

FOREIGN PATENT DOCUMENTS

| | | |
|---|---|---|
| WO | 2018227576 A1 | 12/2018 |
| WO | 2020014706 A1 | 1/2020 |

OTHER PUBLICATIONS

Wong et al., "A Structured Light System for Relative Navigation Applications", IEEE Sensors Journal, Sep. 1, 2016, pp. 6662 through 6679, vol. 16, No. 17, IEEE.

European Patent Office, "Extended European Search Report from EP Application No. 22154116.2", from Foreign Counterpart to U.S. Appl. No. 17/220,344, filed Jul. 15, 2022, pp. 1 through 10, Published: EP.

European Patent Office, "Communication pursuant to Article 94(3)EPC", dated Mar. 19, 2025, EP Application No. 22154116.2, from Foreign Counterpart to U.S. Appl. No. 17/220,344, pp. 1 through 7, Published: EP.

* cited by examiner

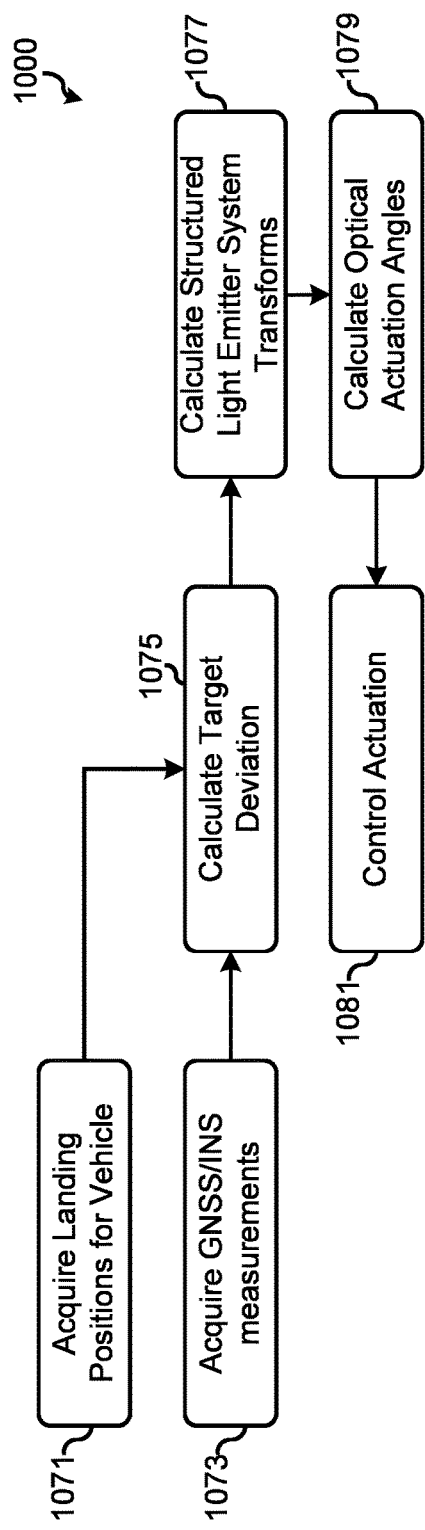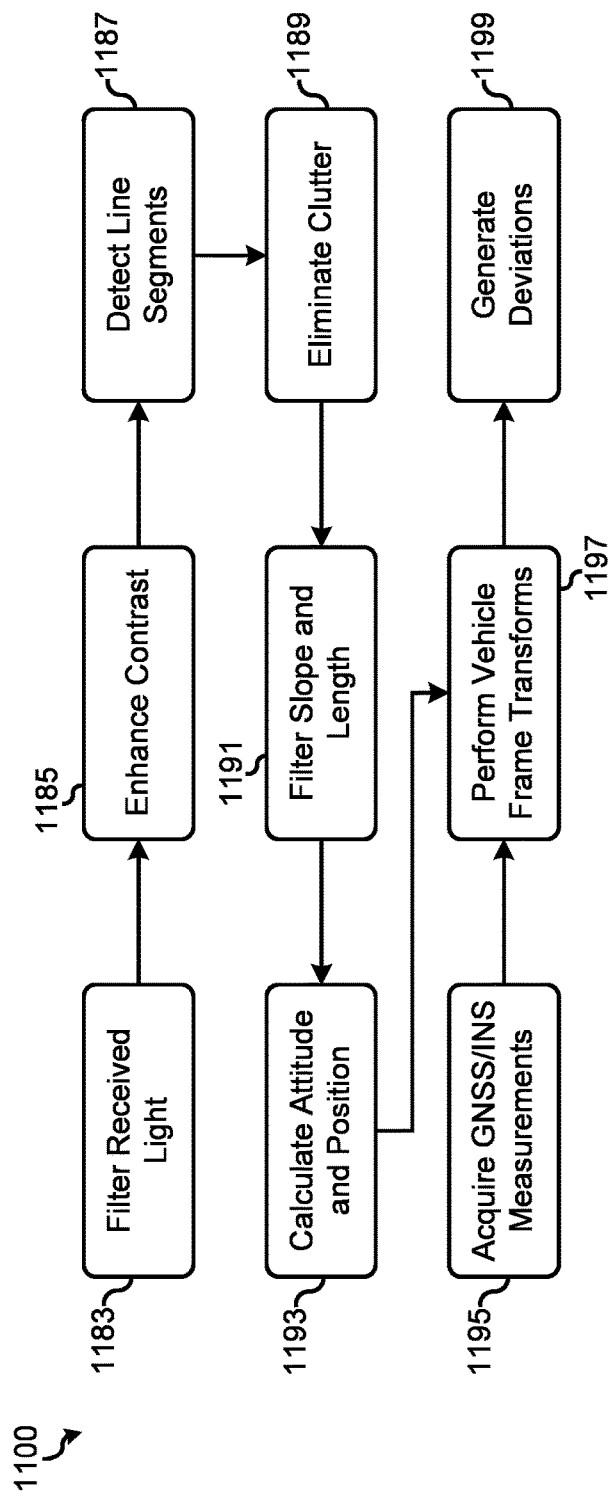
FIG. 10
FIG. 11

STRUCTURED LIGHT NAVIGATION AID

CROSS REFERENCE TO RELATED APPLICATIONS

This application claims benefit of Indian Provisional Application No. 202111006634 filed on Feb. 17, 2021, and entitled "STRUCTURED LIGHT NAVIGATION AID", the contents of which are hereby incorporated in its entirety.

BACKGROUND

Vehicles frequently use navigation systems to acquire information describing the vehicle's position, velocity, and attitude. The navigation information helps the vehicles travel with greater security. Aircraft is one example of a type of vehicle that frequently uses navigation systems. Frequently aircraft use navigation systems to perform multiple activities during the different phases of flight. In particular, aircraft use navigation information to perform landings and, in some circumstances, autonomous landings.

Performing autonomous landings present multiple challenges. In particular, limitations in airborne radio and navigation sensors may limit an aircraft's ability to perform autonomous landings. For example, sensors can lose signals from other devices communicating with the navigation system when operating in dense urban environments. For instance, many navigation systems receive GNSS signals to calculate position in both the horizontal and vertical axis. The accuracy and reliability of GNSS measurements increase the probability of a safe landing. In urban environments, GNSS signals from the GNSS satellites may be inaccessible because of high-rise buildings, geometric dilution of precision due to lack of visibility to widely spaced satellites, multipath interference, and other reasons.

Additional problems with autonomous systems exist when the autonomous system operates near other autonomous systems. When multiple vehicles are operating close to one another, the required navigation precision is increased to prevent the different vehicles from encroaching within the operating vehicles' safe operating envelopes.

Navigation systems frequently use sensor fusion to overcome the issues of using autonomous landing systems in dense urban environments. The navigation systems fuse measurements from multiple sources using Kalman filters and other similar techniques. However, sensor fusion techniques are prone to drift from the ideal output when the navigation system operates in a GNSS denied environment. Accordingly, the lack of a GNSS signal negatively affects the operation of the navigation system.

SUMMARY

Systems and Embodiments for a structured light navigation aid are provided. In certain embodiments, a system includes a structured light emitter that emits structured light towards a surface, wherein the structured light emitter can movably change a direction of emitted structured light. Additionally, the system includes a structured light receiver that receives light from an environment, wherein the structured light receiver identifies reflected structured light from the surface in the received light and calculates navigation information from the reflected structured light. Further, the system includes one or more processors that control the structured light as one of a pre-programmed pattern or a pattern determined during operation of the structured light emitter.

DRAWINGS

Drawings accompany this description and depict only some embodiments associated with the scope of the appended claims. Thus, the described and depicted embodiments should not be considered limiting in scope. The accompanying drawings and specification describe the exemplary embodiments, and features thereof, with additional specificity and detail, in which:

FIG. 10 is a flowchart diagram of a method for controlling a structured-light emitting system according to an aspect of the present disclosure;

FIG. 11 is a flowchart diagram of a method for detecting patterns in reflected structured light according to an aspect of the present disclosure.

Under common practice, the various described features are not drawn to scale but are drawn to emphasize specific features relevant to the example embodiments.

DETAILED DESCRIPTION

In the following detailed description, reference is made to the accompanying drawings that form a part of the present description, and in which is shown, through illustration, specific illustrative embodiments. However, it is to be understood that other embodiments may be used and that logical, mechanical, and electrical changes may be made.

Systems and embodiments for a structured light navigation aid are described in the present disclosure. As discussed above, navigation information provided by a navigation system may drift when an associated vehicle is traveling through a GNSS denied environment. Thus, navigation systems benefit from additional sources of navigation information that are not subject to drift (like the drift over time of inertial measurements). Vision is an example of a source of navigation information that is not subject to drift. Vision sensors may allow the navigation system to perceive the environment in the same manner as a human. However, there are many challenges in making an autonomous system capable of inferring information from vision information in the same way humans infer information. In some embodiments, navigation systems use structured light to acquire some of the desired information.

Structured light has been used in other non-navigation industries, such as manufacturing (3D scanning), the entertainment industry (Xbox, Intel Realsense), and other industries. But, how these other industries use structured light is limited by the applications for the structured light. Typically, structured light does not imply a pre-defined fixed structure of light. Structured light merely means that the structure of the light can be generated to suit the operational need. Accordingly, though used in other industries, structured light may also be used in navigational systems.

As described herein, structured light may be emitted by a structured-light emitter that emits the structured light towards a surface. The surface may reflect the structured light so that a structured-light receiver receives the reflected structured light. Upon reception, the structured-light sensor detects the structured light pattern and processes information from the detected pattern to acquire navigation information. One example where the structured light may be used for navigation information is as an autonomous landing aid. For example, the navigation system may emit the structured light towards a surface to acquire information about the landing area in relation to the autonomous vehicle. The navigation system may then use the navigation information to land using the information in place of or in addition to the information provided by other sensors.

Figure 1:
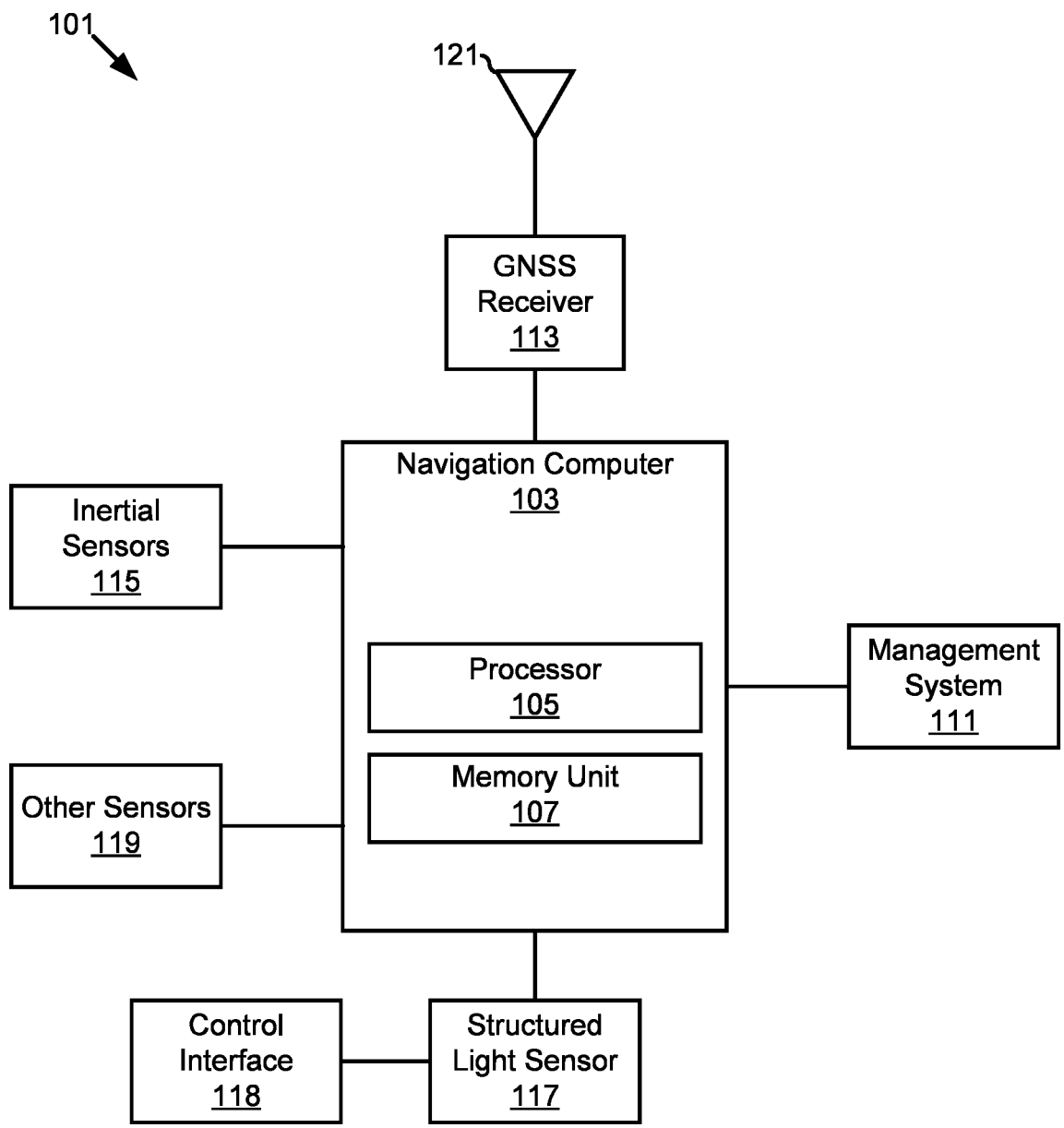
FIG. 1 is a block diagram illustrating a navigation system having a structured light sensor according to an aspect of the present disclosure.

FIG. 1 is a block diagram of a navigation system 101 that includes a structured light navigation aid. The navigation system 101 may be mounted to a vehicle, such as an aircraft, sea craft, spacecraft, automobile, or other vehicle type. Alternatively, the navigation system 101 may be located on or as part of a movable object, such as a phone, personal electronics, land surveying equipment, or other object capable of being moved from one location to another. Additionally, the navigation system 101 may acquire navigation information from one or more different sources. To handle the acquired navigation information, the navigation system 101 may include a navigation computer 103. The navigation computer 103 may further include at least one processor 105 and at least one memory unit 107.

In certain embodiments, the navigation system 101 may acquire navigation information that includes inertial motion information. To acquire the inertial motion information, the navigation system 101 may include inertial sensors 115 that measure and sense the inertial motion of the object having the navigation system 101 mounted thereon. For example, the navigation system 101 may be an inertial navigation system (INS) that receives raw inertial data from a combination of inertial sensors 115, such as gyroscopes and accelerometers. Alternatively, the inertial sensors 115 may be an INS that provides processed inertial navigation data acquired from inertial measurements to the navigation computer 103.

In further embodiments, the navigation system 101 may include additional sensors that can provide navigation data. For example, the navigation system 101 may include one or more other sensors 119. For example, the one or more other sensors 119 may include a vertical position sensor such as an altimeter. The one or more other sensors 119 may include electro-optical sensors, magnetometers, barometric sensors, velocimeters, and/or other types of sensors.

In certain embodiments, the navigation system 101 may use GNSS measurements to calculate navigation information. The navigation system 101 may include a GNSS receiver 113 with at least one antenna 121 that receives satellite signals from multiple GNSS satellites that are observable to the at least one antenna 121. For example, during operation, the GNSS receiver 113 receives GNSS satellite signals from the presently visible GNSS satellites. As used herein, the GNSS satellites may be any combination of satellites that provide navigation signals. For example, the GNSS satellites may be part of the global positioning system (GPS), GLONASS, Galileo system, COMPASS (BeiDou), or other satellite system that form part of a GNSS. The GNSS satellites may provide location information anywhere on the earth. The processor 105 and GNSS receiver 113 may receive the satellite signals and extract position, velocity, and time data from the signals to acquire pseudorange measurements.

The processor 105 and/or other computational devices used in the navigation system 101, the management system 111, or other systems and methods described herein may be implemented using software, firmware, hardware, or appropriate combination thereof. The processor 105 and other computational devices may be supplemented by, or incorporated in, specially-designed application-specific integrated circuits (ASICs) or field programmable gate arrays (FPGAs). In some implementations, the processor 105 and/or other computational devices may communicate through an additional transceiver with other computing devices outside of the navigation system 101, such as those associated with the management system 111 or computing devices associated with other subsystems controlled by the management system 111. The processor 105 and other computational devices can also include or function with software programs, firmware, or other computer-readable instructions for carrying out various process tasks, calculations, and control functions used in the methods and systems described herein.

The methods described herein may be implemented by computer-executable instructions, such as program modules or components, which are executed by at least one processor, such as the processor 105. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer-readable instructions. These instructions are typically stored on appropriate computer program products that include computer-readable media used to store computer-readable instructions or data structures. Such a computer-readable medium may be available media that can be accessed by a general-purpose or special-purpose computer or processor, or any programmable logic device. For instance, the memory unit 107 may be an example of a computer-readable medium capable of storing computer-readable instructions and/or data structures. The memory unit 107 may also store navigation information such as maps, terrain databases, magnetic field information, path data, and other navigation information.

Suitable computer-readable storage media (such as the memory unit 107) may include, for example, non-volatile memory devices including semi-conductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer-executable instructions or data structures.

In certain embodiments, the navigation system 101 includes a structured light sensor 117. As used herein, the structured light sensor 117 is a sensor that emits light in a structured light pattern towards a surface. The surface reflects the structured light towards the structured light sensor 117, where the structured light sensor detects the light and provides electrical signals to the navigation computer 103 for additional processing by the processor 105. In some embodiments, the structured light sensor 117 may include a separate processor from the processor 105. When electrical signals from the detected structured light are processed by the processor 105 (or by a processor on the structured light sensor 117), the processor 105 may detect the pattern of the structured light reflected from the surface. Based on the received pattern, the processor 105 may acquire additional navigation information in addition to the information acquired from the GNSS receiver 113, the inertial sensors 115, and the one or more other sensors 119. The operation of the structured light sensor 117 is described in greater detail below.

In some embodiments, the navigation system may also provide a control interface 118 coupled to the structured light sensor 117. The control interface 118 allows a user, vehicle operator, or computer system to interact with the structured light sensor 117 by allowing the operator to send control signals to and receive navigation information from the structured light sensor 117. In some implementations, the control interface 118 is located on the structured light sensor 117. Alternatively, the control interface 118 may be another system in communication with the structured light sensor 117.

Figure 2:
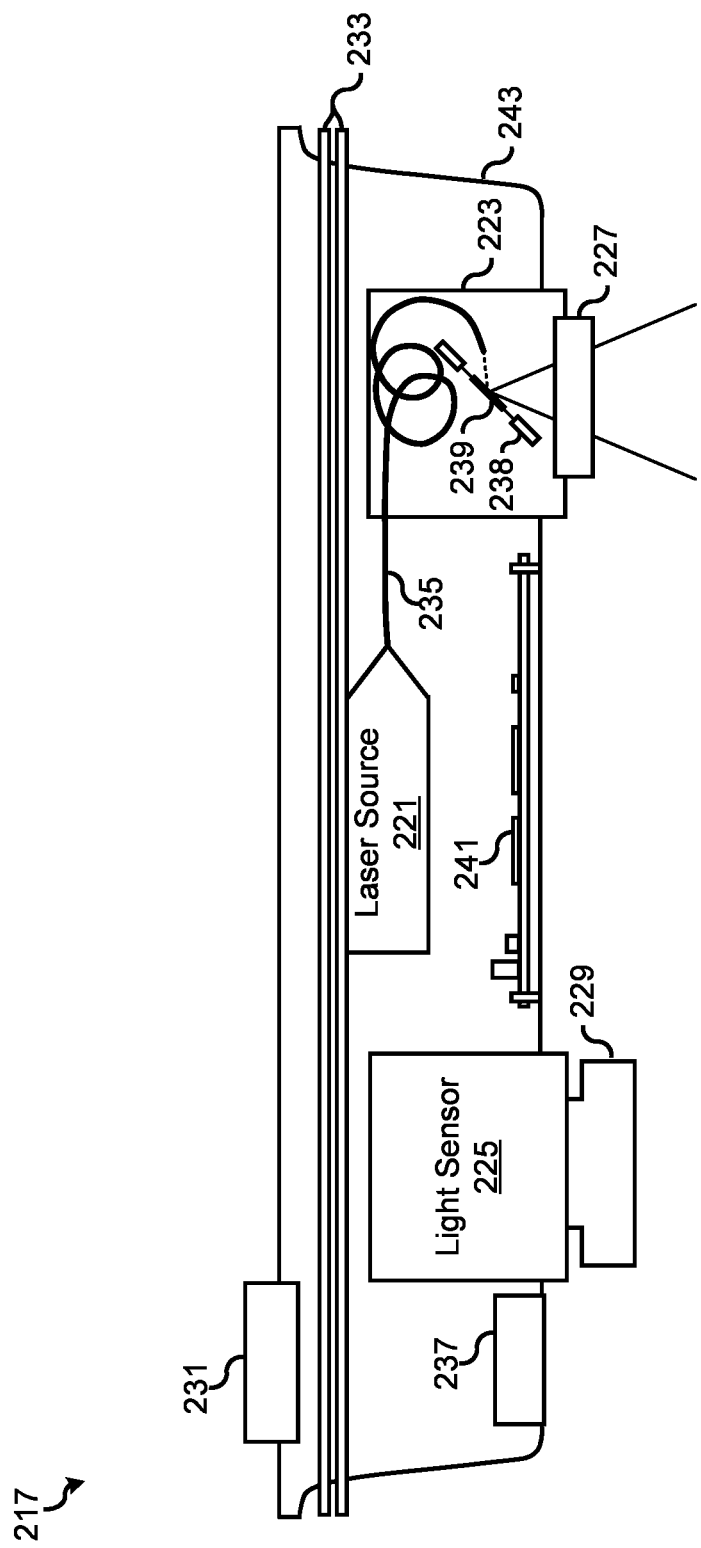
FIG. 2 is a block diagram illustrating a structured light sensor according to an aspect of the present disclosure.

FIG. 2 is a block diagram of a structured light sensor 217. As described above concerning the structured light sensor 117, the structured light sensor 217 includes a structured light emitter that emits structured light towards a surface and a structured light receiver that receives a reflected structured light pattern from the surface. The structured light sensor 217 may determine navigation information based on differences in the reflected structured light pattern and the emitted structured light pattern. Additionally, the structured light sensor 217 may determine information about the surface that reflected the structured light pattern.

In certain embodiments, the structured light sensor 217 may include a laser source 221. The laser source 221 may be a device that is capable of emitting laser light. For example, the laser source 221 may emit a monochromatic beam of light. In some implementations, the laser source 221 may emit a monochromatic beam of light in the infrared frequency range. In some embodiments, the frequency of the light produced by the laser source 221 may depend on the use of the structured light sensor 217, such as the range, penetration, and accuracy of the light that satisfies the desired use of the structured light sensor 217. Additionally, the laser source 221 may connect to some heat sinks 233 to provide convective cooling for the laser source 221. The laser source 221 may be a continuous laser or a pulsed emitter based on the type of structured light emitted by the structured light sensor 217.

The laser source 221 may be coupled to an optical transmissive media 235. The optical transmissive media 235 may be any media capable of transmitting optical fields. The optical transmissive media 235 may be a fiber optic cable, an optical waveguide, or a series of mirrors positioned for directing optical fields through free space. The optical transmissive media 235 may couple the light into a structured light emitter 223. In some embodiments, when the optical transmissive media 235 is fiber optic cable, the optical transmissive media 235 may collimate the light to prevent loss.

The structured light emitter 223 may include a micro-electrical mechanical sensor (MEMS) actuator 238 or other type of actuator 238 that controls the positioning of a mirror 239. The optical transmissive media 235 may emit the light towards the mirror 239. The actuator 238 receives electrical signals that cause the actuator 238 to control the reflective angle of the mirror 239. The light emitted from the optical transmissive media 235 reflects off the mirror 239 and passes through an emitter aperture 227. The light passes through the emitter aperture 227 towards a surface or other target type. The actuator 238 moves the mirror to movably change the direction of the emitted light. Also, the actuator 238 moves the mirror to form the structured light pattern.

In some embodiments, the structured light may reflect off the surface and back towards the structured light sensor 217. The structured light sensor 217 may include a structured light receiver that includes a receiver lens 229 and a light sensor 225. The receiver lens 229 can receive a portion of the light reflected from the surface. The receiver lens 229 directs the received reflected light towards a light sensor 225. In some embodiments, the light sensor 225 may be a bolometer (or other types of light sensors) that detects light of a particular frequency, such as the frequency of the light emitted through the emitter aperture 227. For example, the light sensor 225 may receive light in the infrared frequency range.

In additional embodiments, the light sensor 225 may produce an electrical signal based on the light sensed by the light sensor 225. The light sensor 225 provides the electrical signal to a circuit 241. The circuit 241 may host electronics for an irradiation and sensing algorithm. In some implementations, the host electronics may include a processor that functions similarly to or performs a portion of the functionality of the processor 105. The electronics on the circuit 241 may also receive estimated navigation information, navigational parameters from other systems or vehicle operators and provide output commands to other systems. For example, the structured light sensor 217 may further include a connector 231 to facilitate the communications between the structured light sensor 217 and external systems.

In additional embodiments, the circuit 241 may provide control signals to the actuator 238. The control signals direct the actuator 238 to move the mirror 239 to form a programmed pattern of structured light. In some implementations, the pattern is based on the algorithms executed and the desired outputs. As described above, the laser source 221 may be a pulsed infrared laser emitter. The actuator 238 moves the mirror 239 to reflect the laser light to draw the desired pattern. When the actuator 238 is a MEMS actuator, the actuator 238 moves the mirror 239 to form precise patterns by making small movements. In certain implementations, the structured light sensor 217 may reject high-frequency vibrations to prevent vibrations from interfering with the movement of the mirror 239. For example, the structured light sensor 217 may be attached with a damping mechanism, or the control signals sent to the actuator 238 account for the high-frequency vibrations.

In certain embodiments, the structured light sensor 217 may include additional sensors 237. The additional sensors 237 may provide a source of navigation information independent of the detection of a reflected structured light pattern. For example, the additional sensors 237 may provide position, velocity, and attitude information either as raw or processed navigation data. When the additional sensors 237 provides raw data, processors on the circuit 241 may process the raw data to calculate navigation information, or the circuit 241 may provide the raw data to another processor through the connector 231. Also, the processors on the circuit 241 may fuse the measurements with the measurements acquired through analysis of the structured light.

Figure 3:
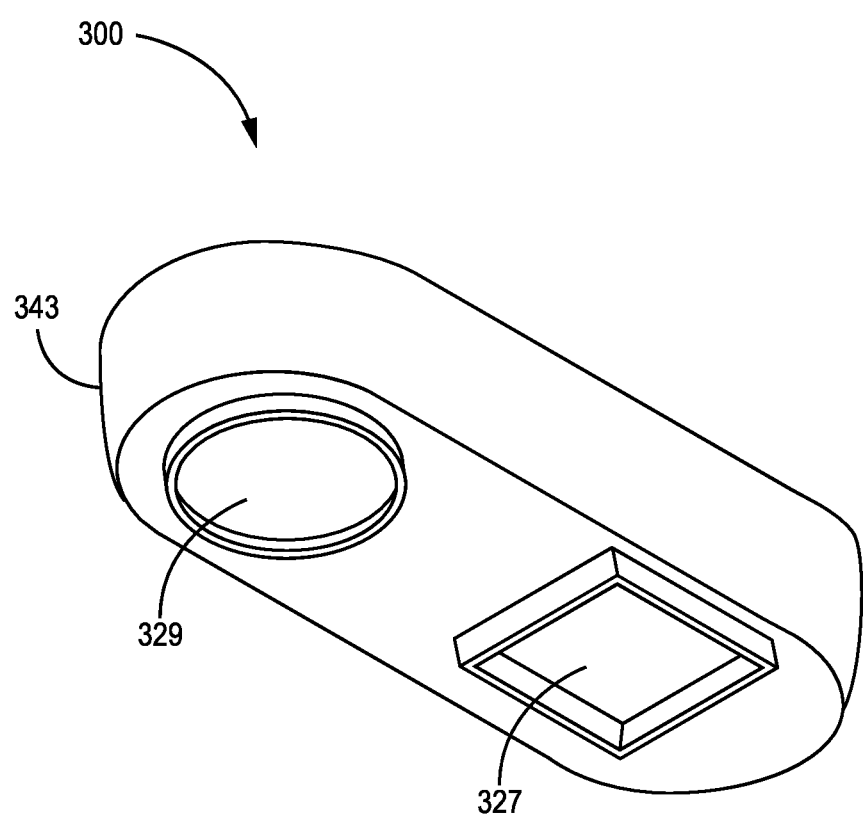
FIG. 3 is an isometric diagram illustrating a structured light sensor according to an aspect of the present disclosure.

In exemplary embodiments, the structured light sensor 217 and other devices may be fabricated within a chassis 243. The chassis 243 may enable the mounting of the various components on the surface of a vehicle at a desired location to facilitate the emittance of the structured light pattern in the desired direction. Additionally, the heat sinks 233 may extend out of the chassis 243 to conduct heat generated within the chassis 243 for convective radiation into the environment outside the chassis 243. FIG. 3 is an isometric diagram illustrating a structured light sensor mounted within a chassis 343. As illustrated, the chassis 343 includes an emitter aperture 327 and a receiver lens 329 on the external surface of the chassis 343. A structured light emitter system may emit light through the emitter aperture 327, and a light sensor (such as light sensor 225) may receive light through the receiver lens 329. Enclosing the structured light sensor 217 within the chassis 243 or 343 limits the footprint of the structured light sensor 217 while providing desired power and data connections through the connector 231.

Figure 4:
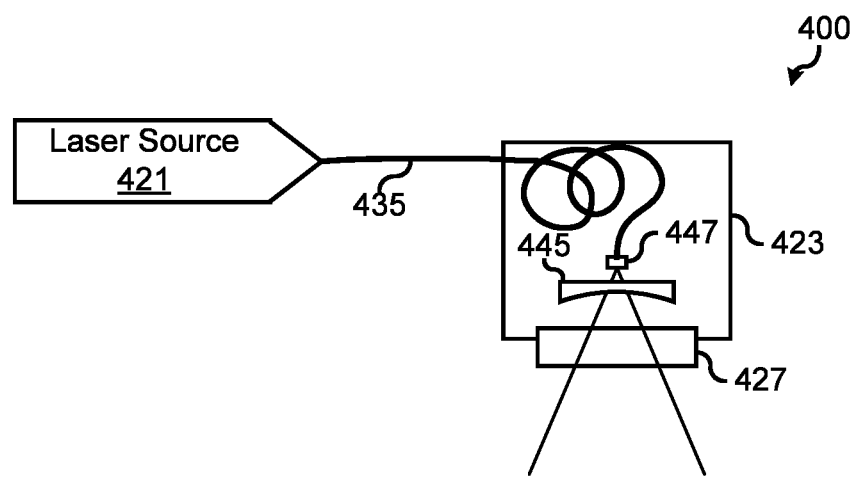
FIG. 4 is a block diagram of a structured light emitting system according to an aspect of the present disclosure.

FIG. 4 is a block diagram of an alternative structured light emitter system 400. As described herein, the alternative structured light emitter system 400 may function similarly to the structured light emitter system described in FIG. 2, where the structured light emitter system is the portion of the structured light sensor 217 that generates and emits structured light towards a surface. For example, the structured light emitter system of the structured light sensor 217 may include the laser source 221, the optical transmissive media 235, the structured light emitter 223, the emitter aperture 227, the actuator 238, and the mirror 239. Similarly, the alternative structured light emitter system 400 may include a laser source 421, an optical transmissive media 435, and an emitter aperture 427 that respectively function like the laser source 221, the optical transmissive media 235, and the emitter aperture 227 in FIG. 2.

In some embodiments, the alternative structured light emitter system 400 may use fixed optics to form the structured light pattern compared to the actuator 238 and mirror 239. For example, the alternative structured light emitter system 400 may use a laser grating 447 to form the pattern and an optical lens 445 to direct the light through the emitter aperture 427. For example, the laser grating 447 may be attached to the end of the optical transmissive media 435. The laser grating 447 has a pattern etched therein, where the etched pattern causes light incident on the laser grating 447 to be emitted according to the etched pattern. The optical lens 445 may direct the light from the laser grating 447 to be directed to the ground. In some embodiments, the alternative structured light emitter system 400 includes a device to move the optical lens 445 to scan an area with the emitted structured light.

As the alternative structured light emitter system 400 uses a fixed laser grating 447 mounted to the optical transmissive media 435, the alternative structured light emitter system 400 may be more immune to the effects of vibrations. However, using a fixed laser grating 447 causes the alternative structured light emitter system 400 to be limited to a single structured light pattern. Also, using a laser grating 447 to form the pattern may decrease the overall pattern intensity due to the splitting of the beam to form the pattern as compared to using the actuator 238 and the mirror 239 to redirect the full laser to form the pattern as described above concerning FIG. 2.

In certain embodiments, the structured light sensor 217 may function as a landing aid. For example, the structured light sensor 217 may be mounted on an autonomous vehicle. The autonomous vehicle can use the structured light sensor 217 to scan a surface in an environment and infer information about the environment. The autonomous vehicle uses the inferred information to perform an autonomous landing with greater precision.

Figure 5:
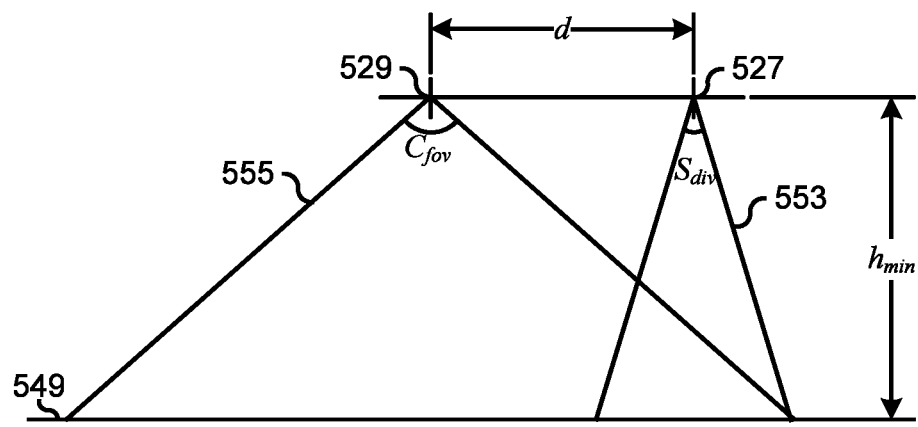
FIG. 5 is a diagram illustrating a frame of reference for a structured light sensor according to an aspect of the present disclosure.

In exemplary embodiments, inferring information about an environment includes establishing a frame of reference for the structured light sensor 217. FIG. 5 is a diagram illustrating a frame of reference for the structured light sensor 217. As shown, FIG. 5 shows the positions of an emitter aperture 527 and a receiver lens 529 in relation to one another and to a surface 549. As described herein, the emitter aperture 527 and the receiver lens 529 function similarly to the emitter aperture 227 and the receiver lens 229 in FIG. 2. As shown, the emitter aperture 527 and the receiver lens 529 are separated from each other by a distance d.

In certain embodiments, the emitter aperture 527 emits the structured light 553 towards the surface 549. Between the emitter aperture 527 and the surface 549, the structured light diverges. The emitted structured light 553 from the emitter aperture 527 diverges at a divergence angle $S_{div}$. Accordingly, the amount and way that the emitted structured light 553 has diverged between the surface 549 and the emitter aperture 527 is dependent on the distance of the surface 549 from the emitter aperture 527, the angle that the emitter aperture 527 emits the light, and the terrain of the surface 549 illuminated by the emitted structured light 553.

In further embodiments, the receiver lens 529 receives reflected structured light within a field of view 555 ($C_{fov}$). For example, the emitter aperture 527 emits structured light 553 towards the surface 549, where the emitted structured light 553 reflects off the surface 549 towards the receiver lens 529. The distance from the surface 549 and the angle of the emitted light in relation to the surface 549 affects whether or not the reflected structured light is within the field of view of the receiver lens 529. In some embodiments, when the emitter aperture 527 and the receiver lens 529 are too close to the surface 549, the structured light pattern incident on the surface 549 may be outside the field of view of the receiver lens 529. The height where the emitter aperture 527 becomes too close to the surface 549, so the structured light pattern incident on the surface 549 is outside the field of view of the receiver lens 529, may be known as the minimum height $h_{min}$. As such, the minimum height may represent the height at which the landing aid becomes unable to provide further aid.

Figure 6A:
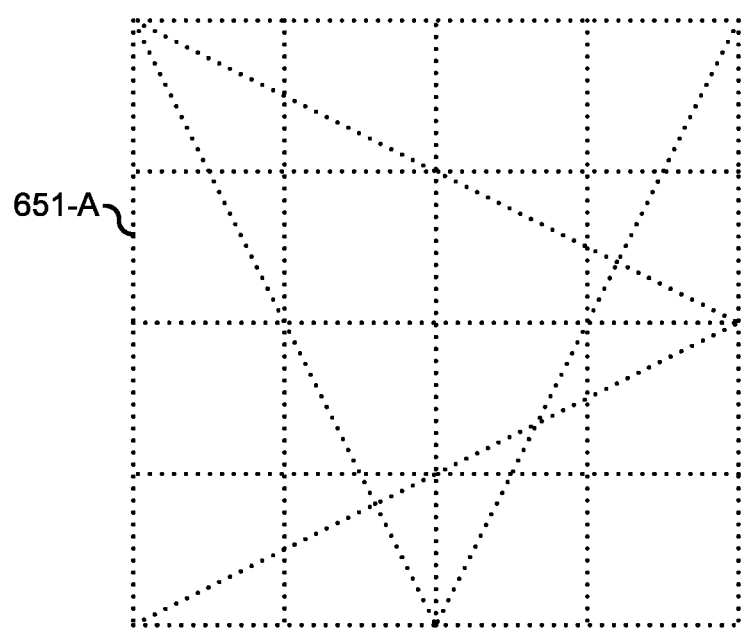
FIGS. 6A and 6B are diagrams illustrating different structured light patterns according to an aspect of the present disclosure.
Figure 6B:
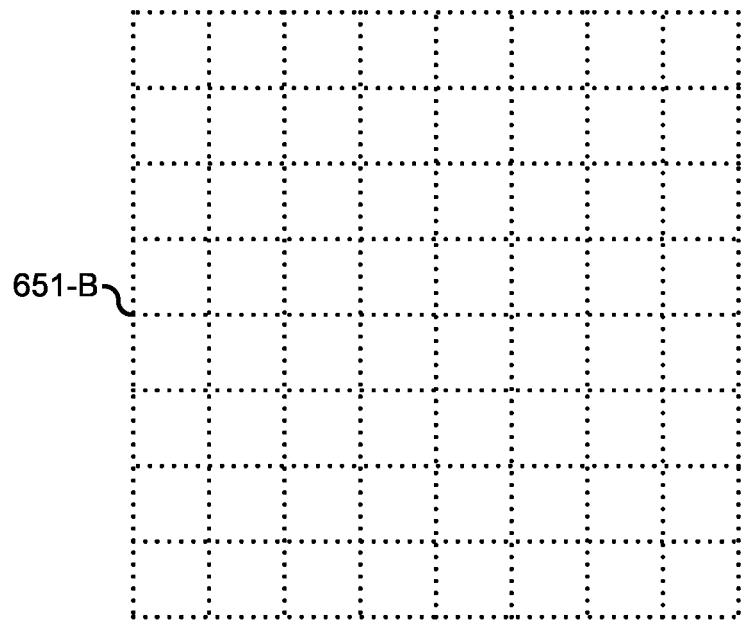

As described above, the actuator 238 may receive control signals that direct the actuator 238 to control the positioning of the mirror 239 to cause a structured light emitter system to emit a structured light pattern. FIGS. 6A and 6B illustrate potential structured light patterns emitted by a structured light emitter system. FIG. 6A illustrates a structured light pattern 651-A that includes a rectangular grid pattern having overlying triangles. FIG. 6B illustrates a structured light pattern 651-B that includes a simple grid pattern. The different structured light patterns emitted by the structured light emitter system may enable different information acquisition. For example, some patterns may provide more information about terrain, while other patterns may provide more distance information. Additionally, the structured light emitter system may be able to change the structured light pattern during operation. In particular, when the structured light sensor 217 forms the structured light pattern using the actuator 238 and mirror 239, the actuator 238 can be controlled to form different structured light patterns during operation.

In some implementations, the structured light sensor 217 may have multiple pre-programmed patterns stored in memory, such as the memory unit 107. Also, the structured light sensor 217 may generate different patterns during operation or receive the patterns through a control interface 118. The different patterns (either pre-programmed or generated patterns during operation) stored in the memory unit 107 may be designed to provide specific information about the surface 549. In some instances, the structured light sensor 217 may cycle through multiple patterns to acquire information describing different characteristics of the surface 549.

In certain embodiments, a processor associated with the structured light sensor 217 may generate navigation information from the received patterns in the structured light. In some implementations, the processor may generate navigation information solely from the presently emitted pattern of the structured light. Alternatively, the processor may generate navigation information based on differences between previously emitted structured light and presently emitted structured light. Additionally, the structured light sensor 217 may identify features base on the received structured light. The identified features may be changes to the emitted patterns that indicate the gradient and roughness of a surface. Other features may be determined based on the differences between the previously emitted and presently emitted structured light. Using the identified features, the structured light sensor 217 or associated processor may generate guidance parameters and update navigation information.

Figure 7A:
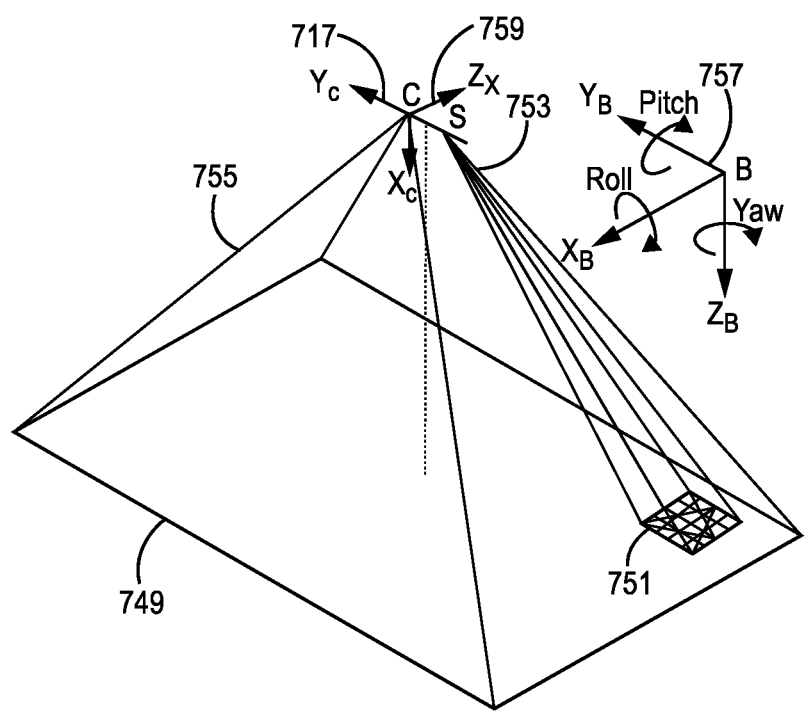
FIGS. 7A and 7B are diagrams illustrating different views of emitted structured light on a surface according to an aspect of the present disclosure.
Figure 7B:
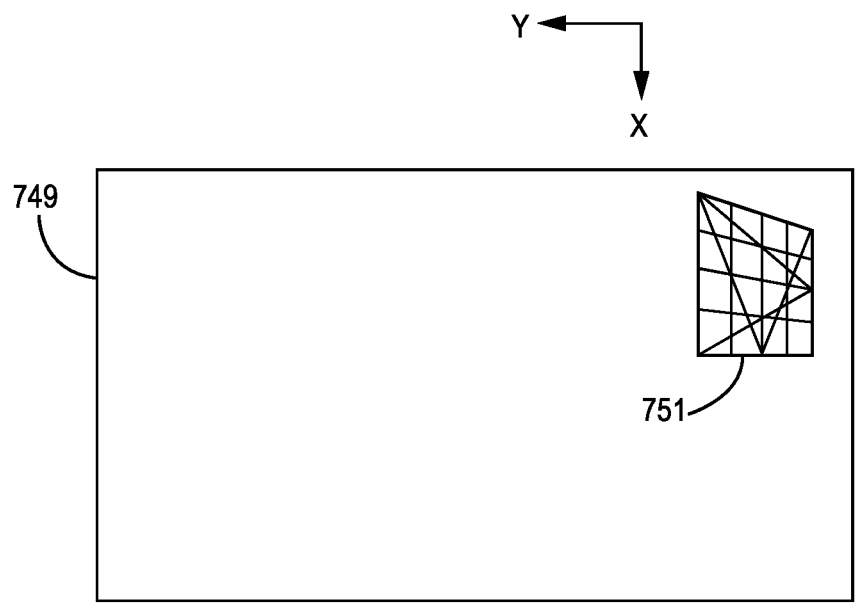

FIGS. 7A and 7B are diagrams illustrating the use of the structured light sensor 717 over a surface 749. As shown in FIG. 7A, the structured light sensor 717 emits structured light 753 towards the surface 749. The structured light pattern 751 is incident on the surface 749 within the field of view 755 of the structured light sensor 717. The structured light sensor 717 detects the emitted structured light 753 as it reflects off the surface 749.

In some embodiments, the structured light sensor 717 is mounted on an aerial vehicle capable of vertical takeoff and landing (VTOL). The VTOL may have a reference axis 757. In some implementations, the structured light sensor 717 may be transversely mounted on the vehicle performing the VTOL.

In exemplary embodiments, the structured light pattern 751 may be controlled to be incident at particular locations on the surface 749. For example, a processor 105 may send control signals to the actuator 238 to change the position of the mirror 239. Alternatively, the position of the optical lens 445 may be changed to control the direction of the light emitted from the structured light emitter system. In some implementations, the direction of the emitted light may be controlled through a processor on the circuit 241 or a processor on an external system. Also, the desired location of the structured light pattern 751 on the surface 749 may be determined by an autonomous algorithm or manually selected by a pilot. Additionally, the desired location of the structured light pattern 751 on the surface 749 may be within the limits of the emitter aperture 527.

In some embodiments, the structured light sensor 717 may scan the surface 749 to identify a suitable landing location on the surface 749. For example, the structured light sensor 717 may scan the surface to identify a location that is level and/or without any landing obstructions. To scan the surface 749, the structured light sensor 717 may move the structured light pattern 751 in a suitable pattern over the surface 749. A suitable pattern may include a raster, spiral, or ladder scanning pattern. Additionally, the scan of the structured light pattern 751 over the surface 749 may be performed to increase the amount of the surface 749 scanned by the structured light sensor 717 or cover an area of interest on the surface 749.

In certain embodiments, the distance between the emitter aperture 527 and the receiver lens 529 on the structured light sensor 717 is known. Accordingly, the structured light sensor 717 may determine the orientation of the structured light pattern 751 on the surface 749. As illustrated in FIG. 6B, where the structured light pattern 651-B is a symmetric grid, the structured light sensor 717 can calculate the orientation of the structured light pattern 751 on the surface 749 due to changes of the structured light pattern 751 caused by the terrain of the surface 749, the relation of the position and orientation of the structured light sensor 717 to the surface 749, and the direction that the structured light sensor 717 emits the structured light 753. Additionally, as illustrated in FIG. 6A, asymmetries may be introduced into the structured light pattern 751 to help identify the orientation of the structured light pattern 751 on the surface 749. Other features can be added to the structured light pattern 751 to acquire additional information about the surface 749 and the relation of the structured light sensor 717 to the surface 749.

In exemplary embodiments, the structured light sensor 717 projects the structured light pattern 751 towards a targeted location on the surface 749. As viewed within a light sensor frame (such as the frame of the light sensor 225 in FIG. 2) on the structured light sensor 717, the structured light pattern 751 may appear distorted due to the perspective of the light sensor 225. The distortions within the structured light pattern 751 viewed by the light sensor 225 allow the structured light sensor 717 to establish a frame of reference of the light sensor 225 concerning the structured light pattern 751 on the surface 749. For example, FIG. 7B illustrates a top-down view of the surface 749, showing the distorted structured light pattern 751 on the surface 749. As shown in FIG. 7B, the structured light pattern 751 illustrates potential distortions of the structured light pattern 651-A in FIG. 6A. The structured light sensor 717 can establish the frame of reference of the light sensor 225 concerning the structured light pattern 751 using the computer vision technique known as perspective geometry.

In certain embodiments, a processor(s) on or connected to the structured light sensor 717 may use perspective geometry within a projective transform technique to resolve the attitude and position of the structured light sensor 717. Specifically, the structured light sensor 717 may project real-world coordinates into the camera frame, where the camera frame has an associated coordinate system 759.

In exemplary embodiments, the mathematical transform used to project real-world coordinates into the camera frame may be as follows:

$$\begin{bmatrix} x \\ y \\ z \end{bmatrix} = K \cdot R_B^C \cdot R_E^B \cdot [I - P_C] \cdot \begin{bmatrix} X \\ Y \\ Z \\ 1 \end{bmatrix}$$

As shown, K refers to the intrinsic calibration matrix of the light sensor 225. The calibration matrix may be provided by the manufacturer of the light sensor 225, calculated during initial calibration, or calculated during a periodic calibration. $R_B{}^C$ refers to a body to light sensor rotation matrix. In particular, $R_B{}^C$ rotates coordinates in the frame of the light sensor 225 into the frame of the body using the structured light sensor 717 for navigation. $R_E{}^B$ refers to an earth-to-body rotation matrix. In particular, $R_E{}^B$ rotates coordinates in the frame of the body using the structured light sensor 717 for navigation into coordinates in the frame of the earth. $P_C$ refers to the position of the light sensor 225 as calculated using other sensors such as measurements from a GNSS or an INS. As an output of the transform, the structured light sensor 717 provides the orientation of the vehicle (roll and pitch) and an update to the position $P_C$.

When the output transforms calculates coordinates in the earth frame, the structured light sensor 717 may convert the three-dimensional coordinates in the earth frame into two-dimensional coordinates in the camera frame by normalizing the z-position of the real-world frame to the camera frame and using the z-position as a scaling factor. For example, the structured light sensor 717 may convert the three-dimensional earth frame coordinates into the two-dimensional camera frame coordinates as follows:

$$\begin{bmatrix} x \\ y \\ z \end{bmatrix} = \begin{bmatrix} x/z \\ y/z \\ z/z \end{bmatrix} = \begin{bmatrix} u \\ v \\ 1 \end{bmatrix}.$$

Figure 8:
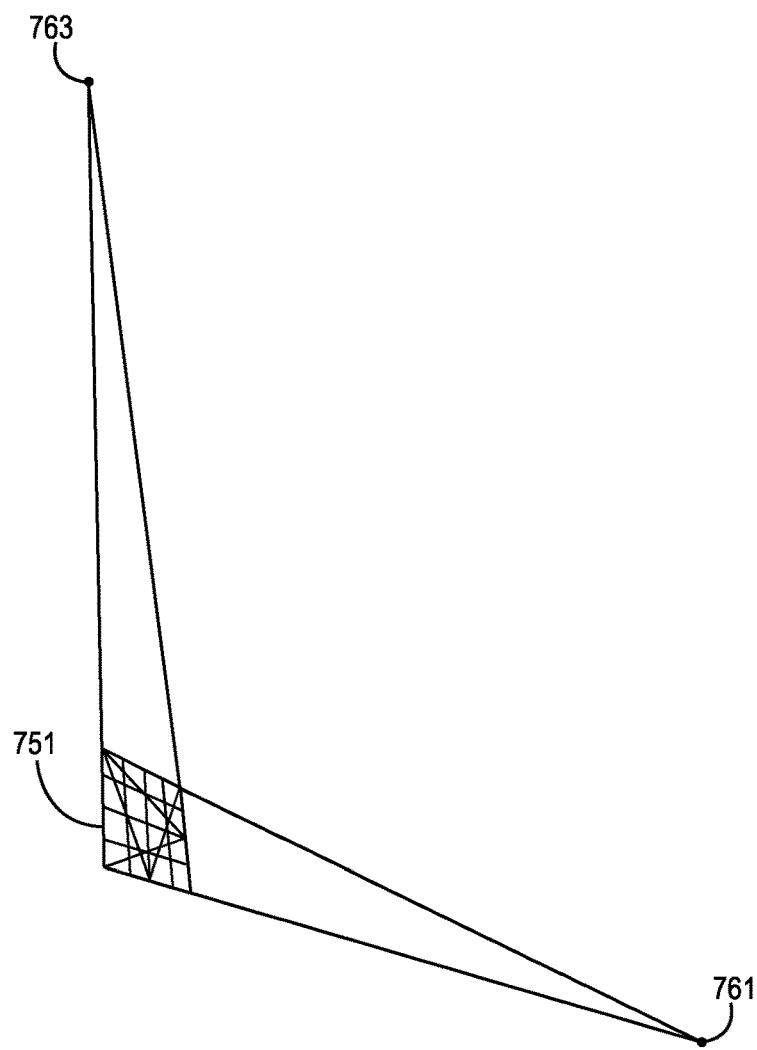
FIG. 8 is a diagram illustrating the identification of vanishing points associated with a detected pattern reflected from a surface according to an aspect of the present disclosure.

The structured light sensor 717 performs the calculation in the camera with respect to the pattern. Thus, the structured light sensor 717 also performs the calculation of the orientation in reference to the pattern. In some embodiments, the structured light sensor 717 calculates the orientation by determining the vanishing points in two dimensions. FIG. 8 is an exemplary diagram showing two vanishing points with respect to the structured light pattern 751. For example, the structured light pattern 751 may have a first vanishing point 761 and a second vanishing point 763. Identifying the first vanishing point 761 and the second vanishing point 763 allows the calculation of roll and pitch with respect to the structured light pattern 751. In real-world coordinates, the first vanishing point 761 is associated with the matrix $[1\ 0\ 0\ 0]^T$ and the second vanishing point 763 is associated with the matrix $[0\ 1\ 0\ 0]^T$.

For one of the first vanishing point 761 and the second vanishing point 763, the structured light sensor 717 may use the following equation:

$$\begin{bmatrix} u \\ v \\ 1 \end{bmatrix} = K \cdot R_B^C \cdot R_E^B \cdot [I - P_C] \cdot \begin{bmatrix} 1 \\ 0 \\ 0 \\ 0 \end{bmatrix}.$$

The above equation is in both axes, and the structured light sensor 717 can recursively calculate $R_E{}^B$ for both vanishing points. Then, the structured light sensor 717 can solve both simultaneous equations to find values of pitch ($\theta$) and roll ($\varphi$) with respect to the pattern.

Simplifying the equations for the vanishing points yields:

$$\begin{bmatrix} \cos\theta \cos\varphi \\ -\sin\varphi \\ \sin\theta \cos\varphi \end{bmatrix} = R_\Psi^T \cdot R_B^C \cdot K^{-1} \cdot \begin{bmatrix} u \\ v \\ 1 \end{bmatrix} = \begin{bmatrix} a \\ b \\ c \end{bmatrix},$$

which can further be simplified into $$\Rightarrow \theta = \tan^{-1}\left(\frac{c}{a}\right), \text{ and } \varphi = \tan^{-1}\left(-b \cdot \cos\frac{\theta}{a}\right).$$

Using the above equations can identify the orientation of the coordinate frame of the light sensor 225 with respect to the structured light pattern 751. However, there are other mathematical methods through which the structured light sensor 717 can identify the orientation using the structured light pattern 751.

In some implementations, the surface 749 observed by the structured light sensor 717 is rough and/or may have a gradient. When there is a gradient, the structured light pattern 751 may appear further skewed. The skewing caused by a gradient may cause vanishing points to be stretched away from the structured light pattern 751 or pulled towards the structured light pattern 751 based on the direction of the gradient. While the equations from above provide information regarding the relative orientation between the structured light sensor 717 and the surface 749, the equations do not provide information about the gradient of the surface 749. However, knowing gradient and roughness of a surface is beneficial when performing a VTOL, as the gradient and roughness of the surface 749 may determine whether the ground is suitable for landing.

Figure 9:
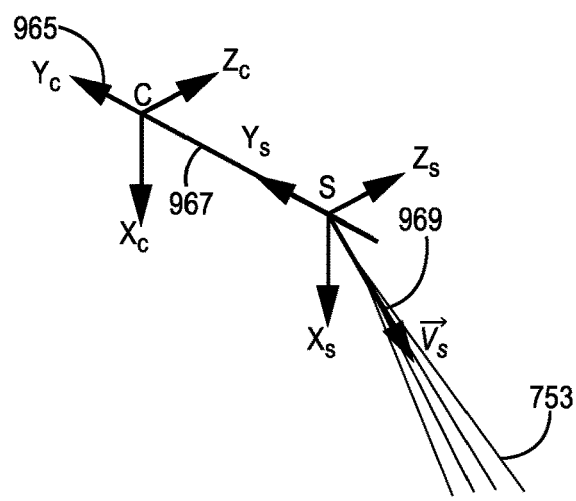
FIG. 9 is a diagram illustrating a vector of emitted structured light according to an aspect of the present disclosure.

FIG. 9 illustrates different connected coordinate frames that can facilitate the calculation of gradient information by a structured light sensor 717. As illustrated, a structured light sensor 717 may have a sensor coordinate frame 965 associated with the light sensor 225 and an emitter coordinate frame 969 associate with the structured light emitter 223. The sensor coordinate frame 965 may have a rigid relationship 967 to the emitter coordinate frame 969 because the light sensor 225 is rigidly connected to the structured light emitter 223. Additionally, the direction $\vec{V}_S$ of the structured light 753 may be known due to the control of the structured light emitter system. The structured light sensor 717 may use the components of $\vec{V}_S$ to calculate an ideal pattern shape on a flat surface from an estimated height. The structured light sensor 717 uses the difference in the orientation calculated at the sensor coordinate frame 965 versus the estimated orientation based on $\vec{V}_S$ to estimate the gradient of the surface. The structured light sensor 717 may additionally determine whether the gradient allows landing on a surface.

In additional embodiments, the structured light sensor 717 may determine roughness information for a surface. The structured light sensor 717 uses the roughness information to determine whether a surface is too rough to permit landing. Similar to the gradient calculation, where a pattern has interior lines, the structured light sensor 717 may identify differences in the interior lines of the pattern observed by the light sensor 225 and compare those against the interior lines of the estimated pattern on a flat surface. Based on the differences, the structured light sensor 717 may determine whether the ground is too rough to permit landing.

FIG. 10 is a flow chart diagram of a method 1000 for controlling an actuator (such as the actuator 238 in FIG. 2) to form the structured light pattern and the direction of the emitted structured light while the structured light sensor 217 functions as a landing aid. The method 1000 begins at 1071, where landing positions are acquired for a vehicle. For example, the structured light sensor 217 may identify a location on the surface where the vehicle is directed to land. The method 1000 then proceeds at 1073, where GNSS/INS measurements are acquired. For instance, a GNSS receiver 113 provides GNSS measurements to the structured light sensor 217, and/or an INS provides inertial measurements to the structured light sensor 217. The method 1000 then proceeds at 1075, where a target deviation is calculated. For example, using the GNSS and INS measurements, the structured light sensor 217 calculates a present position of the structured light sensor 217. The structured light sensor 217 then determines the distance between the calculated present position and the location on the surface where the vehicle is directed to land. Further, the structured light sensor 217 converts the determined distance into roll and pitch commands in the frame of reference of the vehicle.

In certain embodiments, after calculating the target deviation, the method 1000 proceeds at 1077, where structured light emitter system transforms are calculated. For example, the structured light sensor 717 performs transforms that convert commands in the vehicle frame of reference to a reference frame for the structured light emitter system. The method 1000 then proceeds at 1079, where optical actuation angles are calculated. For example, the structured light sensor 717 converts the angular commands from the reference frame for the structured light emitter system into commands for controlling the actuator 238. After calculating the optical actuation angles, the method 1000 proceeds at 1081, where the actuation is controlled. For example, the structured light sensor 717 may provide control signals to the actuator 238 based on the calculated optical actuation angles.

FIG. 11 is a flow chart diagram of a method 1100 for detecting reflected structure light patterns. The method 1100 proceeds at 1183, where received light is filtered. For example, the structured light emitter system may emit light in an infrared frequency range. The structured light sensor 717 may then filter light received through the receiver lens 229 so that only light received in the infrared frequency range of the light emitted by the structured light emitter system is subsequently processed. Filtering the received light may reduce the probability of detecting passive or stray signals.

In further embodiments, the method 1100 proceeds at 1185, where the contrast of the received light is enhanced. For example, the contrast on the received filtered light may be enhanced to increase the luminosity of the pixels associated with the pattern. Further, the method 1100 proceeds at 1187, where line segments are detected. For example, the structured light sensor 717 may detect line segments in the received pixels associated with the structured light pattern. Additionally, the method 1100 proceeds at 1189, where clutter is eliminated. For example, the structured light sensor 717 may remove unnecessary and/or unhelpful data from the detected line segments. The unnecessary or unhelpful data may include data having stray line segments, spurious lines, or other information that may not aid in the performance of calculations.

In some embodiments, the method 1100 proceeds at 1191, where the slope and length of the detected lines are filtered. For instance, the structured light sensor 717 may select line segments that match length and slope criteria. The length and slope criteria may be defined as a part of an operational envelope of the VTOL. Further, the method 1100 proceeds at 1193, where the structured light sensor 717 calculates attitude and position from the selected line segments. For example, the structured light sensor 717 calculates the attitude and position of the structured light sensor 717 in relation to the detected grid, establishing a frame of reference for the light sensor 225 of the structured light sensor 717.

In exemplary embodiments, the method 1100 proceeds at 1197, where vehicle frame transforms are performed. For example, the structured light sensor 717 may convert the position and altitude of the light sensor 225 in reference to the grid into the vehicle frame using a transform matrix as described above. To facilitate the performance of the vehicle frame transforms, the method 1100 proceeds at 1195, where GNSS and/or INS measurements are acquired. As described above, the GNSS measurements and INS measurements may provide data related to the position, velocity, and attitude of the structured light sensor 717, which are used as inputs for performing the vehicle frame transforms. After performing the transforms, the method 1100 proceeds at 1199, where deviations are generated. For example, the structured light sensor 717 may derive the position and angular deviation of the vehicle from the centroid of the detected pattern. Using the generated deviations, a processor can generate guidance parameters for controlling the vehicle. The guidance parameters are parameters that control the vehicle to aid the vehicle in moving towards a desired destination.

In some embodiments, position and attitude information acquired from the structured light sensor 717 may be used as a source of navigational data that can be fused with other position, velocity, and attitude information using sensor fusion techniques such as statistical filtering (Kalman, extended Kalman, etc.). Further, the structured light sensor 717 may function as a source of navigational data in GNSS-denied environments. For example, the structured light sensor 717 may store an initial navigation state and provide navigation measurements based on detected navigation changes. A navigation computer may use measurements acquired through the structured light sensor 717 to constrain drift in inertial measurements.

Figure 12:
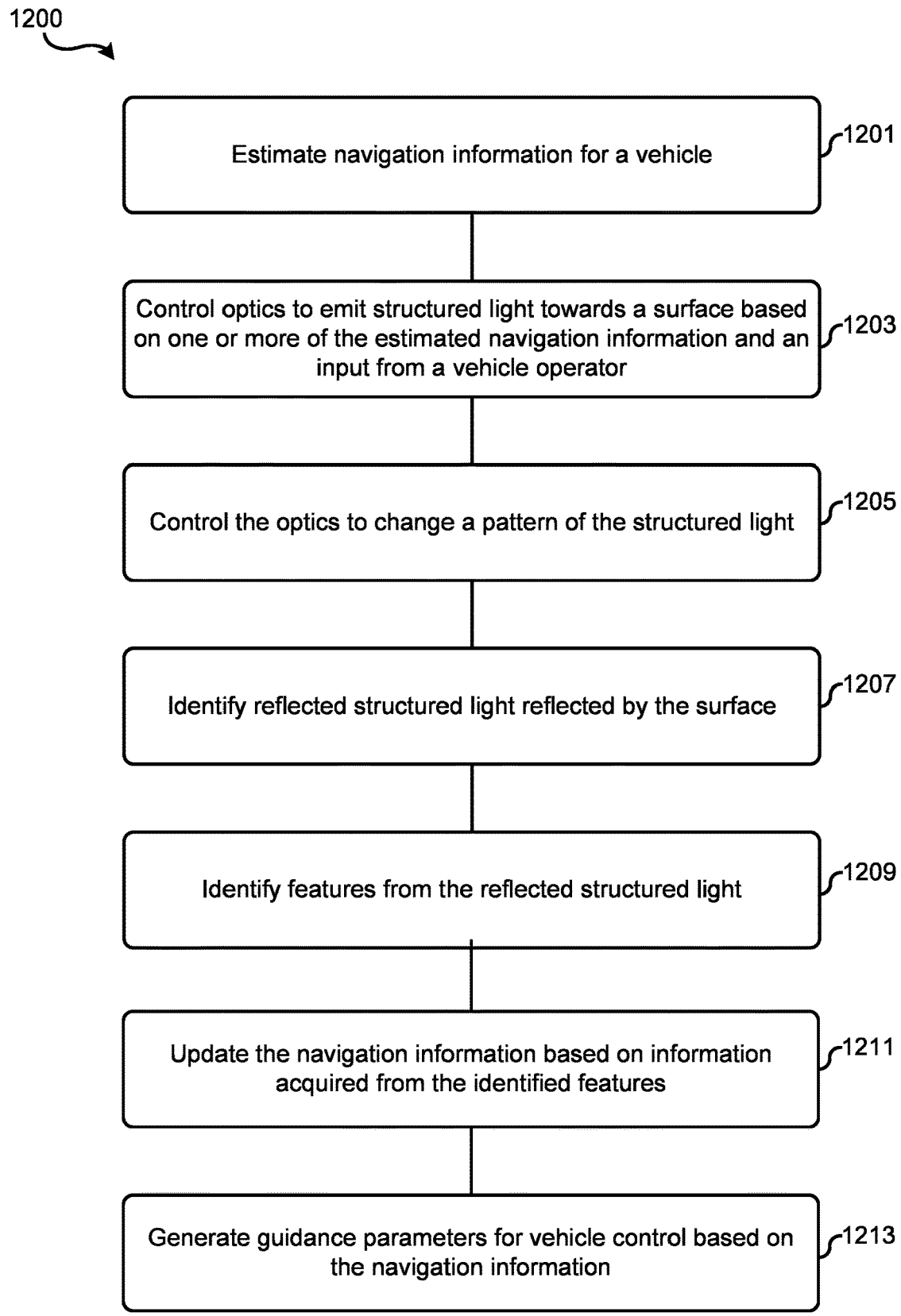
FIG. 12 is a flowchart diagram of a method for using a structured light navigation aid according to an aspect of the present disclosure.

FIG. 12 is a flowchart diagram of a method 1200 for using a structured light navigation aid. The method 1200 proceeds at 1201, where navigation information is estimated for a vehicle. The method 1200 then proceeds at 1203, where optics are controlled to emit structured light towards a surface based on one or more of the estimated navigation information and on input from a vehicle operator. Also, the method 1200 proceeds at 1205, where the optics are controlled to change a pattern of the structured light.

In certain embodiments, the method 1200 proceeds at 1207, where reflected structured light reflected by the surface is identified. Moreover, the method 1200 proceeds at 1209, where features from the reflected structured light are identified. Also, the method 1200 proceeds at 1211, where the navigation information is updated based on information acquired from the identified features. Further, the method 1200 proceeds at 1213, where guidance parameters for vehicle control are generated based on the navigation information.

Example Embodiments

Example 1 includes a system comprising: a structured light emitter that emits structured light towards a surface, wherein the structured light emitter can movably change a direction of emitted structured light; a structured light receiver that receives light from an environment, wherein the structured light receiver identifies reflected structured light from the surface in the received light and calculates navigation information from the reflected structured light; and one or more processors that control the structured light as one of a pre-programmed pattern or a pattern determined during operation of the structured light emitter.

Example 2 includes the system of Example 1, further comprising a control interface that allows interaction between an operator and the structured light emitter.

Example 3 includes the system of any of Examples 1-2, further comprising a memory unit that stores a plurality of patterns comprising one or more pre-programmed patterns or one or more patterns determined during the operation of the structured light emitter.

Example 4 includes the system of Example 3, wherein the one or more processors cycle through the plurality of patterns, where each pattern in the plurality of patterns allows acquisition of different information about the surface.

Example 5 includes the system of any of Examples 1-4, wherein the structured light emitter and the structured light receiver are mounted in a chassis.

Example 6 includes the system of any of Examples 1-5, wherein the one or more processors solely generates navigation information from a presently emitted pattern in the structured light.

Example 7 includes the system of any of Examples 1-6, wherein the one or more processors provide navigation information based on differences between previously emitted structured light and presently emitted structured light.

Example 8 includes the system of any of Examples 1-7, wherein the one or more processors acquire gradient information about the surface based on the structured light reflected off the surface.

Example 9 includes the system of any of Examples 1-8, wherein the one or more processors acquire roughness information about the surface based on the structured light reflected off the surface.

Example 10 includes the system of any of Examples 1-9, wherein the one or more processors scan the surface to determine a suitable landing location based on gradient and roughness.

Example 11 includes a method comprising: estimating navigation information for a vehicle; controlling optics to emit structured light towards a surface based on one or more of the estimated navigation information and an input from a vehicle operator; controlling the optics to change a pattern of the structured light; identifying reflected structured light reflected by the surface; identifying features from the reflected structured light; updating the navigation information based on information acquired from the identified features; and generating guidance parameters for vehicle control based on the navigation information.

Example 12 includes the method of Example 11, further comprising identifying a suitable landing area based on the identified features.

Example 13 includes the method of any of Examples 11-12, wherein controlling the optics to emit the structured light towards the surface comprises: acquiring a landing position for the vehicle; acquiring measurements from one or more other navigation information sources; calculating a target deviation; calculating structured light emitter transforms; calculating optical actuation angles; and controlling actuation for the optics.

Example 14 includes the method of any of Examples 11-13, wherein calculating the navigation information from the identified features comprises: filtering received light in a frame of data; enhancing contrast between pixels in the frame; detecting line segments in the frame; eliminating clutter in the frame; filtering the line segments based on slope and length of the line segments; calculating attitude and position of the vehicle; acquiring measurements from one or more other navigation information sources; performing vehicle frame transforms; and generating location and angular deviation of the vehicle from a centroid of the pattern.

Example 15 includes the method of any of Examples 11-14, wherein controlling the optics to change the pattern of the structured light comprises changing the pattern into at least one of: a pre-programmed pattern; and a generated pattern that is determined during operation.

Example 16 includes the method of any of Examples 11-15, wherein controlling the optics to change the pattern of the structured light comprises cycling through a plurality of patterns, wherein each pattern in the plurality of patterns allows acquisition of different information about the surface.

Example 17 includes the method of any of Examples 11-16, wherein identifying the features from the reflected structured light further comprises acquiring gradient information about the surface based on the reflected structured light.

Example 18 includes the method of any of Examples 11-17, wherein identifying the features from the reflected structured light further comprises acquiring roughness information about the surface based on the reflected structured light.

Example 19 includes the method of any of Examples 11-18, further comprising scanning the surface to determine a suitable landing location based on gradient and roughness.

Example 20 includes a system comprising: a structured light sensor comprising: a chassis; a structured light emitter mounted within the chassis that emits structured light towards a surface, wherein the structured light emitter can movably change a direction and pattern of the emitted structured light; a structured light receiver that receives light from an environment, wherein the structured light receiver identifies reflected structured light from the surface in the received light and calculates navigation information and feature information; and one or more processors that control the structured light as one of a pre-programmed pattern or a generated pattern determined during operation, wherein the one or more processors scan the surface to identify a suitable landing location based on the feature information; and one or more other sensors that provide additional navigation information to the structured light sensor.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:
1. A system comprising:
a structured light emitter mounted to a vehicle configured to emit a structured light pattern from the vehicle towards a surface in an environment of the vehicle, wherein the structured light emitter can movably change a direction of the emitted structured light pat- tern, wherein the structured light pattern is emitted as an arrangement of light forming at least one controlled shape;

a structured light receiver configured to receive light from the environment, wherein the structured light receiver is configured to identify differences in geometric properties of the received light reflected from the surface geometric properties of the emitted structured light pattern and to calculate orientation and position for the vehicle from the differences within the structured light pattern in the received light reflected from the surface based on establishing a frame of reference for the structured light receiver concerning the structured light pattern on the surface; and one or more processors configured to control the structured light as one of a pre-programmed pattern or a pattern determined during operation of the structured light emitter.

2. The system of claim 1, further comprising a control interface that allows interaction between an operator and the structured light emitter.

3. The system of claim 1, further comprising a memory unit that stores a plurality of patterns comprising one or more pre-programmed patterns or one or more patterns determined during the operation of the structured light emitter.

4. The system of claim 3, wherein the one or more processors cycle through the plurality of patterns, where each pattern in the plurality of patterns allows acquisition of different information about the surface.

5. The system of claim 1, wherein the structured light emitter and the structured light receiver are mounted in a chassis.

6. The system of claim 1, wherein the one or more processors solely generates navigation information from a presently emitted pattern in the structured light.

7. The system of claim 1, wherein the one or more processors provide navigation information based on differences between previously emitted structured light and presently emitted structured light.

8. The system of claim 1, wherein the one or more processors acquire gradient information about the surface based on the structured light reflected off the surface.

9. The system of claim 1, wherein the one or more processors acquire roughness information about the surface based on the structured light reflected off the surface.

10. The system of claim 1, wherein the one or more processors scan the surface to determine a suitable landing location based on gradient and roughness.

11. A method comprising:
estimating navigation information for a vehicle;
controlling optics to emit structured light towards a surface based on one or more of the estimated orientation and position of a vehicle and an input from a vehicle operator;
controlling the optics to change a pattern of the emitted structured light, wherein the pattern of the emitted structured light is an arrangement of light forming at least one controlled shape;
identifying reflected structured light reflected by the surface;
identifying geometric properties within a pattern of the structured light reflected from the surface and the emitted structured light pattern;
updating the orientation and the position of the vehicle based on information acquired from the identified geometric properties within the pattern of the structured light reflected from the surface based on establishing a frame of reference for structured light at the receiver; and
generating guidance parameters for vehicle control based on the navigation information.

12. The method of claim 11, further comprising identifying a suitable landing area based on the identified features.

13. The method of claim 11, wherein controlling the optics to emit the structured light towards the surface comprises:
acquiring a landing position for the vehicle;
acquiring measurements from one or more other navigation information sources;
calculating a target deviation;
calculating structured light emitter transforms;
calculating optical actuation angles; and
controlling actuation for the optics.

14. The method of claim 11, wherein calculating the navigation information from the identified features comprises:
filtering received light in a frame of data;
enhancing contrast between pixels in the frame;
detecting line segments in the frame;
eliminating clutter in the frame;
filtering the line segments based on slope and length of the line segments;
calculating attitude and position of the vehicle;
acquiring measurements from one or more other navigation information sources;
performing vehicle frame transforms; and
generating location and angular deviation of the vehicle from a centroid of the pattern.

15. The method of claim 11, wherein controlling the optics to change the pattern of the structured light comprises changing the pattern into at least one of:
a pre-programmed pattern; and
a generated pattern that is determined during operation.

16. The method of claim 11, wherein controlling the optics to change the pattern of the structured light comprises cycling through a plurality of patterns, wherein each pattern in the plurality of patterns allows acquisition of different information about the surface.

17. The method of claim 11, wherein identifying the features from the reflected structured light further comprises acquiring gradient information about the surface based on the reflected structured light.

18. The method of claim 11, wherein identifying the features from the reflected structured light further comprises acquiring roughness information about the surface based on the reflected structured light.

19. The method of claim 11, further comprising scanning the surface to determine a suitable landing location based on gradient and roughness.

20. A system comprising:
a structured light sensor comprising:
a chassis;
a structured light emitter mounted within the chassis configured to emit a structured light pattern towards a surface, wherein the structured light emitter can movably change a direction of the emitted structured light pattern;
a structured light receiver configured to receive light from an environment, wherein the structured light receiver is configured to identify differences in geometric properties within a structured light pattern in the received light reflected from the surface and geometric properties of the emitted structured light pattern in the received light and to calculate orientation and position of a vehicle and feature information from the differences within the structured light pattern in the received light reflected from the surface and the emitted structured light pattern based on establishing a frame of reference for the structured light receiver concerning the structured light pattern on the surface; and one or more processors configured to control the structured light as one of a pre-programmed pattern or a generated pattern determined during operation as an arrangement of light forming at least one shape, wherein the one or more processors scan the surface to identify a suitable landing location based on the feature information; and one or more other sensors that provide additional navigation information to the structured light sensor.

* * * * *